United States Patent
Hind et al.

(10) Patent No.: US 10,904,170 B2
(45) Date of Patent: *Jan. 26, 2021

(54) BUSINESS OBJECT ACTION JUSTIFICATION FOR BUSINESS OBJECT INTEGRATION INTO MESSAGING

(71) Applicant: Sinoeast Concept Limited, Hong Kong (HK)

(72) Inventors: John R. Hind, Raleigh, NC (US); Naveenkumar V. Muguda, Bangalore (IN)

(73) Assignee: SINOEAST CONCEPT LIMITED, Hong Kong (HK)

( * ) Notice: Subject to any disclaimer, the term of this patent is extended or adjusted under 35 U.S.C. 154(b) by 159 days.

This patent is subject to a terminal disclaimer.

(21) Appl. No.: 16/153,827

(22) Filed: Oct. 8, 2018

(65) Prior Publication Data

US 2019/0044897 A1 Feb. 7, 2019

Related U.S. Application Data

(63) Continuation of application No. 15/338,397, filed on Oct. 30, 2016, now Pat. No. 10,097,483, which is a
(Continued)

(51) Int. Cl.
*H04L 12/58* (2006.01)
*G06Q 10/10* (2012.01)
*H04L 29/08* (2006.01)

(52) U.S. Cl.
CPC ............. *H04L 51/04* (2013.01); *G06Q 10/10* (2013.01); *H04L 51/22* (2013.01); *H04L 67/02* (2013.01)

(58) Field of Classification Search
CPC ......... G06Q 10/10; H04L 51/04; H04L 51/22; H04L 67/02
See application file for complete search history.

(56) References Cited

U.S. PATENT DOCUMENTS

| 5,793,365 A | 8/1998 | Tang et al. |
| 8,775,513 B2 | 7/2014 | Hind et al. |

(Continued)

FOREIGN PATENT DOCUMENTS

| CN | 101447952 A | 6/2009 |
| CN | 101447953 A | 6/2009 |

(Continued)

OTHER PUBLICATIONS

U.S. Appl. No. 11/948,323, Non-Final Office Action, dated Sep. 18, 2009, 13 pg.

(Continued)

*Primary Examiner* — Ranodhi Serrao
(74) *Attorney, Agent, or Firm* — Anova Law Group, PLLC

(57) ABSTRACT

Embodiments of the present invention address deficiencies of the art in respect to messaging and provide a method, system and computer program product for business object integration with messaging. In an embodiment of the invention, a method for messaging integration of a business object can be provided. The method can include embedding a business object in message text in a messaging session provided by a messenger, and applying an action to the business object from within the messaging session of the messenger. The method further can include forwarding a copy of the message text to a backend business component as a justification to the applied action.

17 Claims, 2 Drawing Sheets

Related U.S. Application Data continuation of application No. 11/948,342, filed on Nov. 30, 2007, now Pat. No. 9,497,041.

(56) References Cited

U.S. PATENT DOCUMENTS

| | | | |
|---|---|---|---|
| 8,782,250 | B2 | 7/2014 | Hind et al. |
| 8,788,698 | B2 | 7/2014 | Hind et al. |
| 9,299,114 | B2 | 3/2016 | Hind et al. |
| 9,344,389 | B2 | 5/2016 | Hind et al. |
| 9,497,041 | B2 | 11/2016 | Hind et al. |
| 10,097,483 | B2 | 10/2018 | Hind et al. |
| 2002/0147645 | A1 | 10/2002 | Alao et al. |
| 2003/0220784 | A1 | 11/2003 | Fellenstein et al. |
| 2003/0023691 | A1 | 12/2003 | Knauerhase |
| 2004/0059609 | A1 | 3/2004 | Chatlain et al. |
| 2004/0083292 | A1 | 4/2004 | Lueckhoff et al. |
| 2004/0268246 | A1 | 12/2004 | Leban et al. |
| 2006/0053194 | A1* | 3/2006 | Schneider ............ H04L 67/36 709/204 |
| 2006/0123347 | A1 | 6/2006 | Hewitt et al. |
| 2007/0124312 | A1 | 5/2007 | Simpson et al. |
| 2007/0244811 | A1 | 10/2007 | Tumminaro |
| 2008/0141146 | A1 | 6/2008 | Jones |
| 2008/0243966 | A1 | 10/2008 | Holtzman et al. |
| 2009/0043857 | A1 | 2/2009 | Ferlitsch |
| 2009/0089250 | A1 | 4/2009 | Stieber et al. |
| 2009/0129278 | A1 | 5/2009 | Kumar et al. |
| 2009/0144371 | A1 | 6/2009 | Hind et al. |
| 2009/0144372 | A1 | 6/2009 | Hind et al. |
| 2009/0144373 | A1 | 6/2009 | Hind et al. |
| 2009/0144386 | A1 | 6/2009 | Hind et al. |
| 2014/0317208 | A1 | 10/2014 | Hind et al. |
| 2014/0317209 | A1 | 10/2014 | Hind et al. |
| 2014/0317534 | A1 | 10/2014 | Hind et al. |
| 2017/0054660 | A1 | 12/2017 | Hind et al. |

FOREIGN PATENT DOCUMENTS

| | | |
|---|---|---|
| CN | 101447954 A | 6/2009 |
| CN | 101447955 A | 6/2009 |
| JP | 2003505794 A1 | 2/2003 |
| JP | 2005527878 A1 | 9/2005 |
| JP | 2006506740 A | 2/2006 |
| TW | 200937225 A | 9/2009 |
| TW | 200939707 A | 9/2009 |
| TW | 200939708 A | 9/2009 |
| TW | I448112 B | 8/2014 |
| TW | I460599 B | 11/2014 |
| WO | 0108065 A1 | 2/2001 |
| WO | 03034174 A2 | 4/2003 |
| WO | 2004046956 A1 | 6/2004 |

OTHER PUBLICATIONS

U.S. Appl. No. 11/948,323, Non-Final Office Action, dated Apr. 10, 2010, 13 pg.
U.S. Appl. No. 11/948,323 Final Office Action, dated Aug. 12, 2010, 20 pg.
U.S. Appl. No. 11/948,323, Notice of Appeal and Appeal Brief, dated Nov. 9, 2010, 20 pg.
U.S. Appl. No. 11/948,323, Examiner's Answer, dated Feb. 1, 2011, 24 pg.
U.S. Appl. No. 11/948,323, Reply Brief, dated Mar. 27, 2011, 7 pg.
U.S. Appl. No. 11/948,323, Decision on Appeal, dated Dec. 31, 2013, 9 pg.
U.S. Appl. No. 11/948,323, Notice of Allowance, dated Mar. 11, 2014, 7 pg.
U.S. Appl. No. 11/948,370, Non-Final Office Action, dated Sep. 18, 2009, 12 pg.
U.S. Appl. No. 11/948,370, Non-Final Office Action, dated Mar. 12, 2010, 14 pg.
U.S. Appl. No. 11/948,370, Final Office Action, dated Aug. 12, 2010, 21 pg.
U.S. Appl. No. 11/948,370, Notice of Appeal and Appeal Brief, dated Nov. 9, 2010, 48 pg.
U.S. Appl. No. 11/948,370, Examiner's Answer, dated Feb. 1, 2011, 23 pg.
U.S. Appl. No. 11/948,370, Reply Brief, dated Mar. 27, 2011, 10 pg.
U.S. Appl. No. 11/948,370, Decision on Appeal, dated Dec. 24, 2013, 9 pg.
U.S. Appl. No. 11/948,370, Notice of Allowance, dated Mar. 4, 2014, 7 pg.
U.S. Appl. No. 11/948,398, Non-Final Office Action, dated Sep. 15, 2009, 12 pg.
U.S. Appl. No. 11/948,398, Non-Final Office Action, dated Mar. 2, 2009, 13 pg.
U.S. Appl. No. 11/948,398, Final Office Action, dated Aug. 13, 2010, 16 pg.
U.S. Appl. No. 11/948,398, Notice of Appeal and Appeal Brief, dated Nov. 9, 2010, 43 pg.
U.S. Appl. No. 11/948,398, Examiner's Answer, dated Jan. 31, 2011, 20 pg.
U.S. Appl. No. 11/948,398, Reply Brief, dated Mar. 27, 2011, 9 pg.
U.S. Appl. No. 11/948,398, Decision on Appeal, dated Dec. 31, 2013, 8 pg.
U.S. Appl. No. 11/948,398, Notice of Allowance, dated Mar. 14, 2014, 7 pg.
U.S. Appl. No. 11/948,342, Non-Final Office Action, dated Sep. 4, 2009, 11 pg.
U.S. Appl. No. 11/948,342, Final Office Action, dated Mar. 9, 2010, 20 pg.
U.S. Appl. No. 11/948,342, Notice of Appeal and Appeal Brief, dated Jun. 16, 2010, 43 pg.
U.S. Appl. No. 11/948,342, Examiner's Answer, dated Aug. 25, 2010, 23 pg.
U.S. Appl. No. 11/948,342, Reply Brief, dated Oct. 25, 2010, 15 pg.
U.S. Appl. No. 11/948,342, Decision on Appeal, dated Nov. 29, 2013, 9 pg.
U.S. Appl. No. 11/948,342, Request for Rehearing, dated Jan. 29, 2014, 12 pg.
U.S. Appl. No. 11/948,342, Decision on Reconsideration Request, dated Feb. 26, 014, 6 pg.
U.S. Appl. No. 11/948,342, Non-Final Office Action, dated May 12, 2015, 8 pg.
U.S. Appl. No. 11/948,342, Final Office Action, dated Oct. 2, 2015, 14 pg.
U.S. Appl. No. 11/948,342, Notice of Allowance, dated Jul. 28, 2016, 10 pg.
U.S. Appl. No. 14/292,869, Non-Final Office Action, dated May 21, 2015, 10 Pg.
U.S. Appl. No. 14/292,869, Final Office Action, dated Nov. 5, 2015, 14 Pg.
U.S. Appl. No. 14/292,869, Notice of Allowance, dated Feb. 17, 2016, 6 Pg.
U.S. Appl. No. 14/293,022, Non-Final Office Action, dated May 4, 2015, 11 Pg.
U.S. Appl. No. 14/293,022, Final Office Action, dated Oct. 1, 2015, 13 Pg.
U.S. Appl. No. 14/293,022, Notice of Allowance, dated Jun. 22, 2016, 5 Pg.
U.S. Appl. No. 14/293,083, Non-Final Office Action, dated Apr. 9, 2015, 11 Pg.
U.S. Appl. No. 14/293,083, Final Office Action, dated Sep. 30, 2015, 5 Pg.
U.S. Appl. No. 14/293,083, Notice of Allowance, dated Dec. 22, 2015, 6 Pg.
U.S. Appl. No. 15/338,397, Non-Final Office Action, dated Dec. 28, 2017, 9 pg.
U.S. Appl. No. 15/338,397, Notice of Allowance, dated May 31, 2018, 9 pg.

* cited by examiner

BUSINESS OBJECT ACTION JUSTIFICATION FOR BUSINESS OBJECT INTEGRATION INTO MESSAGING

BACKGROUND OF THE INVENTION

Field of the Invention

The present invention relates to the field of messaging and more particularly to the integration of business objects within a message.

Description of the Related Art

Messaging forms the heart of the Internet. The Internet with its global, continuous reach enables interpersonal activities from afar, including both asynchronous messaging like e-mail and document sharing and threaded discussions, to real time communications systems such as instant messaging and group chat. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation. Thus, the instant messaging environment has proven to be an invaluable compliment to e-mail as a real-time conversational mechanism.

Conventional messaging systems allow users to exchange messages across a network. As a stand alone application, messaging enjoys straightforward application as a conversational tool. Within, the business workflow environment, however, the role of the message, whether synchronous or asynchronous, is less clear. A business workflow generally involves the electronic and in person collaboration between collaborators in order to accomplish a goal. As part of the business workflow, collaborators receive documents electronically, amend the documents and ultimately approve or disprove of the distribution of the document. Business objects have been specifically incorporated into document editing and document viewing applications in order to permit the management of a document in a business workflow.

Specifically, a business object encapsulates traditional lower-level objects that implement a business process. Notably, business objects both simulate corporate procedures and translate smoothly into software objects. Historically, business objects have been embedded in Web pages and e-mail documents using client side extensions to browser clients. More recently, scripts disposed in client side content like Web pages and e-mail messages have been configured to maintain an active connection with underlying business objects to provide an integrated active view of the business objects. The integration of business objects, however, has largely eluded both asynchronous communications like e-mail, shared documents and threaded discussions, and synchronous real-time applications like instant messengers and group chat sessions.

BRIEF SUMMARY OF THE INVENTION

Embodiments of the present invention address deficiencies of the art in respect to messaging and provide a novel and non-obvious method, system and computer program product for business object integration with messaging. In an embodiment of the invention, a method for messaging integration of a business object can be provided. The method can include embedding a business object in message text in a messaging session provided by a messenger, and applying an action to the business object from within the messaging session of the messenger. The method further can include forwarding a copy of the message text to a backend business component as a justification to the applied action.

In one aspect of the embodiment, the method further can include identifying a pronoun in the chat text referencing the business object, and visually distinguishing the identified pronoun in the chat text to draw a correlation between the business object and the pronoun. In a second aspect of the embodiment, the method further can include identifying a verb in the chat text in association with a pronoun referencing the business object, and providing a context menu for the business object in the chat session with entries in the context menu limited according to the identified verb. In a third aspect of the embodiment, the method further can include generating a chat transcript for the chat session with a split view of the chat text and the business object and applied action. Finally, in a fourth aspect of the embodiment, the method further can include indexing the chat session with keywords in the chat text and tags for the business object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for integrating business objects in a messaging session. In accordance with an embodiment of the present invention, a business object can be embedded in a messaging session such as an e-mail exchange, instant messaging or chat session, threaded discussion, or shared document library, to name only a few. Thereafter, pronouns in the text of the session referencing the business object can be visually distinguished to assist in the understanding of the role of the business object in the session. Using the pronouns, a verb operating on the business object can be identified and the entries of a context menu for the business object can be reduced accordingly. Yet further, the business objects can be indexed and the index can be used when producing a transcript for the session. In this regard, the transcript can include separate views of the messaging text and the business object. Finally, the session can provide a justification for actions performed on the business object by forwarding a copy of the chat text to an external component supporting the business object.

Figure 1:
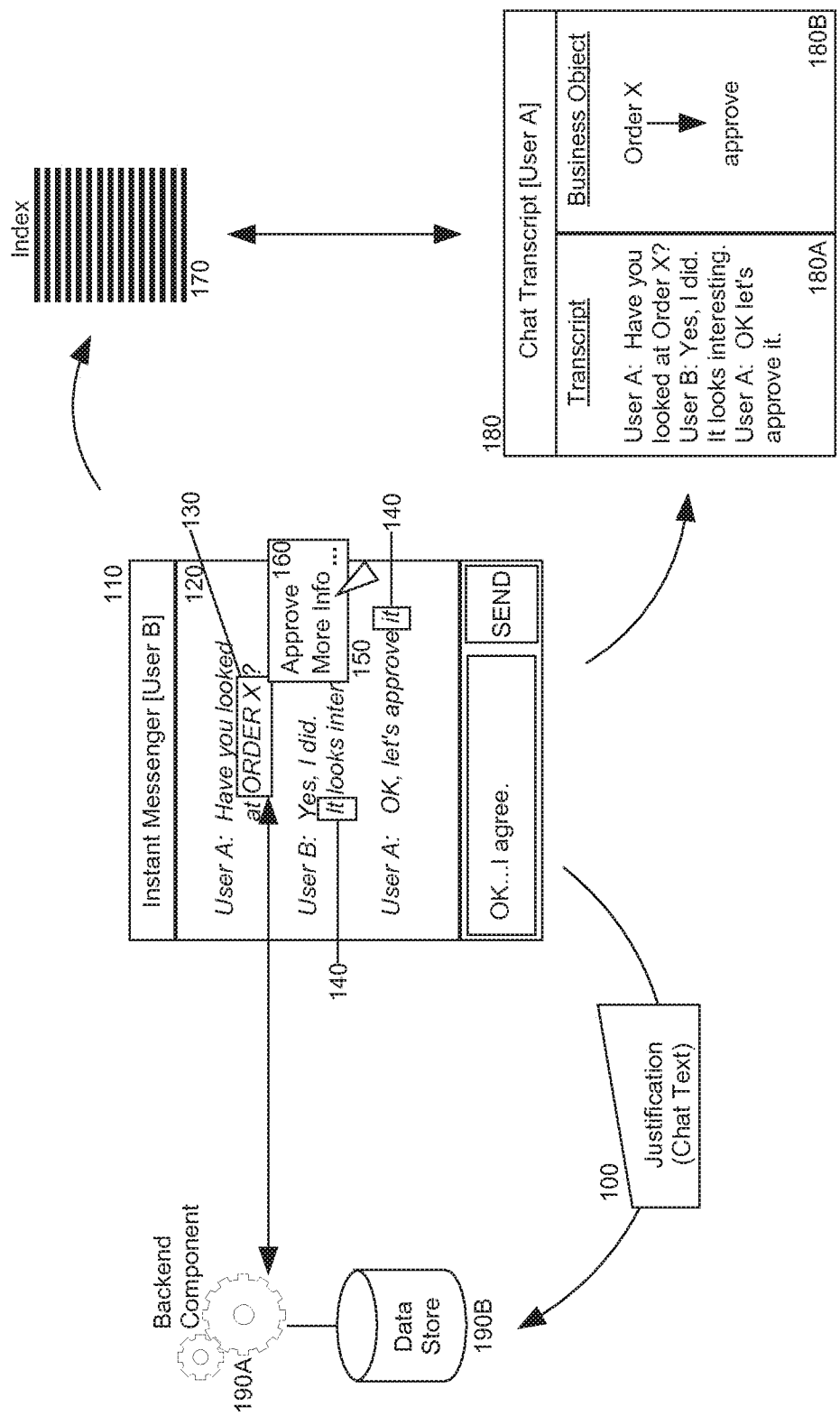
FIG. 1 is a pictorial illustration of a messaging application configured for business object integration.

In further illustration, FIG. 1 pictorially depicts a messenger configured for business object integration. As shown in FIG. 1, an instant messenger 110, shown for exemplary purposes only, can support a chat between users. The chat text 120 can be provided in the instant messenger 110 and a business object 130 coupled to a backend component 190A and corresponding data store 190B can be embedded in the chat text 120. Of note, different pronouns can be included in the chat text 120 referencing the business object 130. To that end, the chat text can be linguistically parsed to identify the pronouns 140 that reference the business object 130. For example, the chat text can be linguistically parsed to identify the pronouns 140 that reference the business object 130 utilizing anaphora resolution. Thereafter, the pronouns 140 can be visually distinguished from the rest of the chat text 120 in order to facilitate a viewing of the chat text 120 in reference to the business object 130.

Notably, a context menu 150 can be provided for the business object 130 in the instant messenger 110. The context menu 150 can include entries 160 permitting actions to be performed in respect to the business object 130. The entries 160, however, can be reduced depending upon the context of the chat text 120. In this regard, different grammatical constructs relating to the pronouns 140 in the chat text 120 can be identified according to grammatical rules such as Sentence→Noun Phrase+Verb Phrase, Verb Phrase-→Verb+Noun Phrase, and Noun Phrase→article+Noun. Thereafter, the verbs acting on the pronouns 140 can be determined and matched to a reduced set of the entries 160 for the context menu 150. For example, as shown in FIG. 1, the verb "approve" in connection with "it" can map to the entries 160 "Approve" and "More info". In this way, an end user invoking the context menu 150 need only be presented with pertinent entries 160 in the context menu 150.

Once an action has been performed on the business object 130, the action can be communicated to the backend component 190A. To provide a justification for the action, the chat text 120 can be encapsulated in justification data 100 and provided to the backend component 190A for storage as a record in the data store 190B. In this way, one reviewing the action for the business object 130 will access the justification 100 to provide context for the action.

The instant messenger 110 can produce a chat transcript 180 of the chat text 120. To facilitate a viewing of the chat text 120, however, the chat transcript 180 can provide one transcript view 180A of the chat text 120 and another business object view 180B of the business object 130. In the business object view 180B, a listing of each business object 130 and the corresponding action taken upon the business object 130 can be provided. In this way, the viewer can readily identify actions taken upon business objects integrated into the instant messenger 110.

Finally, a keyword index 170 can be generated for the chat transcript 180 in order to facilitate the searching of the chat transcript 180. Though inverted indexing can be performed on the chat text 120, the business objects 130 can be indexed differently in that the business object 130 can be represented in the chat text 120 with attribute tags. In this way, the attribute tags for the business object 130 can be reflected in the index 170 as opposed to the business object 130, itself.

Importantly, the skilled artisan is to recognize that the exemplary use of an instant messenger 110 in FIG. 1 is not to be construed as limiting the scope of the term "messenger" merely to real-time communicators like an instant messenger or group chat. Rather, the skilled artisan is to recognize that other messengers can equally suffice, including an e-mail system, a threaded discussion forum or a shared document library, to name a few. In all circumstances, the skilled artisan would realize that the instant messenger 110 can be replaced with an e-mail client providing a view to a thread of e-mails, or a discussion forum environment providing view to discussion forum text in a threaded discussion forum, or a shared document library environment providing view to shared documents in a shared document library. Likewise, chat transcript 180 can easily be replaced with an aggregation of e-mail content in a thread of e-mails, or an aggregation of a threaded discussion in a discussion forum, or an aggregation of documents in a shared document library.

Figure 2:
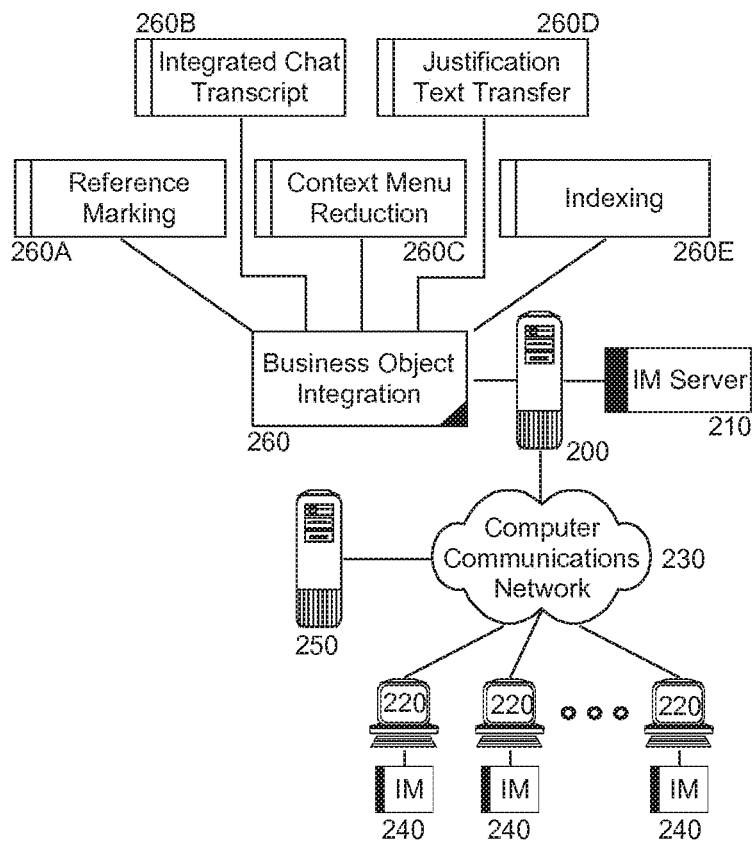
FIG. 2 is a schematic illustration of a messaging data process system configured for business object integration; and, FIG. 3 is a flow chart illustrating a process for reducing a context menu for a business object based upon messaging text in a messaging session.

In further illustration, FIG. 2 schematically depicts a messaging data process system configured for business object integration. The system can include a host server 200 communicatively coupled to one or more clients 220 over computer communications network 230. The host server 200 can support the operation of a messaging server 210 such as an instant messaging server shown for exemplary purposes only, accessed by one or messaging clients 240 in respective ones of the clients 220. A backend server 250 supporting the operation of one or more business components (not shown) further can be coupled to the host server 200 over the computer communications network.

Notably, business object integration logic 260 can be coupled to the messaging server 210 through the host server 200. Alternatively, the business object integration logic 260 can be coupled to one or more of the clients 220 or the business object integration logic 260 can be distributed between the host server 200 and the clients 220. The logic 260 can include program code enabled to integrate a business object into a messaging session and to provide integrative tools including reference marking, messaging transcript processing, context menu reduction, justification text transfer and business object indexing. To that end, the business object integration logic 260 can include a reference marking module 260A, an integrated messaging transcript module 260B, a context menu reduction module 260C, a justification text transfer module 260D and a business object indexing module 260E.

Figure 3:
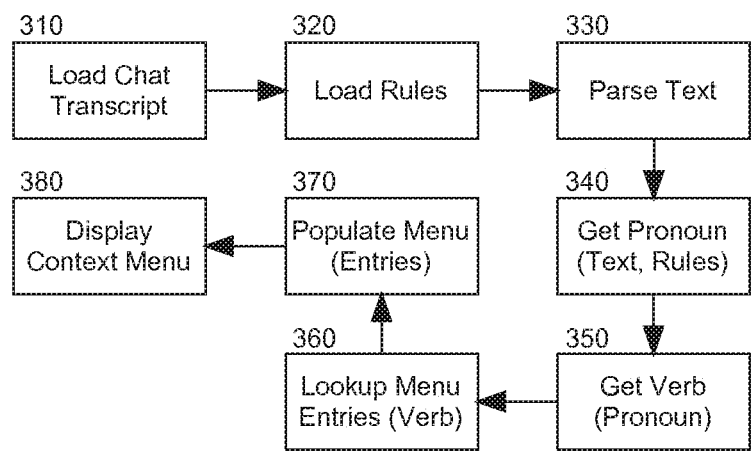

The reference marking module 260A can be enabled to identify pronouns in message text, to correlate the pronouns with a business object in the message text and to visually distinguish the pronouns so as to overtly specify the reference of the pronouns to the business object. The integrated messaging transcript module 260B can be enabled to provide a split view of chat text for a messaging session and business objects embedded in the messaging session and corresponding actions performed on the business objects. The context menu reduction module 260C can be enabled to identify and map verbs in message text in association with an embedded business object in order to produce a reduced set of entries to be rendered in a context menu for the business object in the messaging session. Specifically, FIG. 3 is a flow chart illustrating a process for reducing a context menu for a business object based upon message text in a messaging session.

Beginning in block 310, chat text for a messaging session can be loaded and rules for locating pronouns can be loaded as well in block 320. In block 330, the message text can be parsed and in block 340 one or more pronouns referencing a business object can be located by applying the rules to the message text. Subsequently, a verb can be identified in association with a pronoun in block 350. In block 360, a set of menu entries associated with the verb can be located in a table and in block 370, a context menu can be populated with the set of menu entries. Finally, in block 380 the context menu can be displayed in association with the business object in the message session.

Returning to FIG. 2, the justification text transfer module 260D can be enabled to provide the message text for a messaging session to a backend business component to be associated with an action performed on a business object for the backend business component as a justification for the action. Finally, the indexing module 260E can index tags for the business object when indexing message text for a message session in a message transcript. In this way a business object embedded in a messaging session can be searched along with the message text of the message session in a message transcript with contextual relevance.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method for messaging integration of a business object, the method comprising:
   embedding, in a message session provided by a messenger executing on a first client in message communication with a second client, the business object into a message text;
   applying, from within the message session, an action to the business object;
   forwarding, by the first client and based upon the applied action, a copy of the message text to a backend business component separate from the first client, wherein the business object encapsulates lower-level objects that implement a business process;
   displaying, on the second client, a split view of the message text and the business object, wherein the split view includes a left-side view and a right-side view, the message text is positioned in the left-side view, and the business object along with the action is positioned in the right-side view;
   identifying, in the message text, a verb in association with the business object; and
   displaying, in the split view, a connection between the business object and the verb.

2. The method of claim 1, wherein the messenger is an instant messenger, the message text is a chat text, and the message session is a chat session.

3. The method of claim 1, wherein the messenger is an e-mail messenger, the message text is an e-mail text, and the message session is an e-mail session.

4. The method of claim 1, wherein the messenger is a discussion forum environment, the message text is a discussion forum text, and the message session is a threaded discussion forum.

5. The method of claim 1, wherein the messenger is a shared document library environment, the message text is a shared document, and the message session is a shared document library.

6. The method according to claim 1, further comprising:
   providing, within the message session, a context menu including entries, the entries permitting actions to be performed in respect to the business object, wherein the actions include the action as applied to the business object.

7. The method according to claim 1, further comprising:
   communicating to the backend business component, by the first client, the action as applied to the business object.

8. A client computer configured for messaging integration of a business object, the client computer comprising: a memory; and a processor coupled to the memory, the processor being configured to perform:
- embedding, in a message session provided by a messenger, the business object into a message text, wherein the message session is in communication with a second client;
- applying, from within the message session, an action to the business object;
- forwarding, based upon the applied action, a copy of the message text to a backend business component separate from the first client, wherein the business object encapsulates lower-level objects that implement a business process;
- displaying, on the second client, a split view of the message text and the business object, wherein the split view includes a left-side view and a right-side view, the message text is positioned in the left-side view, and the business object along with the action is positioned in the right-side view;
- identifying, in the message text, a verb in association with the business object; and
- displaying, in the split view, a connection between the business object and the verb.

9. The client computer of claim 8, wherein the messenger is an instant messenger, the message text is a chat text, and the message session is a chat session.

10. The client computer of claim 8, wherein the messenger is an e-mail messenger, the message text is an e-mail text, and the message session is an e-mail session.

11. The client computer of claim 8, wherein the messenger is a discussion forum environment, the message text is a discussion forum text, and the message session is a threaded discussion forum.

12. The client computer of claim 8, wherein the messenger is a shared document library environment, the message text is a shared document, and the message session is a shared document library.

13. A computer program product, comprising: a hardware storage device having stored therein computer readable program code for messaging integration of a business object, the computer readable program code, which when executed by a client computer, causes the client computer to perform the following:
- embedding, in a message session provided by a messenger executing on the client computer in message communication with a second client, the business object into a message text;
- applying, from within the message session, an action to the business object;
- forwarding, by the client computer and based upon the applied action, a copy of the message text to a backend business component separate from the client computer, wherein the business object encapsulates lower-level objects that implement a business process;
- displaying, on the second client, a split view of the message text and the business object, wherein the split view includes a left-side view and a right-side view, the message text is positioned in the left-side view, and the business object along with the action is positioned in the right-side view:
- identifying, in the message text, a verb in association with the business object; and
- displaying, in the split view, a connection between the business object and the verb.

14. The computer program product of claim 13, wherein the messenger is an instant messenger, the message text is a chat text, and the message session is a chat session.

15. The computer program product of claim 13, wherein the messenger is an e-mail messenger, the message text is an e-mail text, and the message session is an e-mail session.

16. The computer program product of claim 13, wherein the messenger is a discussion forum environment, the message text is a discussion forum text, and the message session is a threaded discussion forum.

17. The computer program product of claim 13, wherein the messenger is a shared document library environment, the message text is a shared document, and the message session is a shared document library.

* * * * *